(12) United States Patent
Wei et al.

(10) Patent No.: US 11,966,012 B2
(45) Date of Patent: Apr. 23, 2024

(54) PROJECTION LENS INCLUDING FOUR LENSES OF −+−+ REFRACTIVE POWERS

(71) Applicant: Coretronic Corporation, Hsin-Chu (TW)

(72) Inventors: Ching-Chuan Wei, Hsin-Chu (TW); Yi-Chin Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 317 days.

(21) Appl. No.: 17/199,452

(22) Filed: Mar. 12, 2021

(65) Prior Publication Data

US 2022/0035127 A1 Feb. 3, 2022

(30) Foreign Application Priority Data

Jul. 28, 2020 (CN) .......................... 202021515224.3

(51) Int. Cl.
| | |
|---|---|
| *G02B 13/16* | (2006.01) |
| *G02B 9/34* | (2006.01) |
| *G02B 13/00* | (2006.01) |
| *G02B 13/18* | (2006.01) |

(52) U.S. Cl.
CPC .............. *G02B 13/004* (2013.01); *G02B 9/34* (2013.01); *G02B 13/16* (2013.01); *G02B 13/18* (2013.01)

(58) Field of Classification Search
CPC ........ G02B 13/004; G02B 9/34; G02B 13/16; G02B 13/18; G02B 13/0065; G02B 27/18; G03B 21/00
See application file for complete search history.

(56) References Cited

U.S. PATENT DOCUMENTS

| | | |
|---|---|---|
| 2002/0196564 A1 | 12/2002 | Sato |
| 2007/0268598 A1 | 11/2007 | Kang et al. |

(Continued)

FOREIGN PATENT DOCUMENTS

| | | |
|---|---|---|
| CN | 102566014 | 7/2012 |
| TW | 200925644 | 6/2009 |
| TW | 201118414 | 6/2011 |

(Continued)

OTHER PUBLICATIONS

"Search Report of Europe Counterpart Application", dated Dec. 17, 2021, p. 1-p. 7.

*Primary Examiner* — Wen Huang
(74) *Attorney, Agent, or Firm* — JCIPRNET (57) ABSTRACT

A projection lens projecting an image beam provided by a light valve onto a screen is provided. The projection lens includes first to fourth lenses in order from a screen side to a display side along an optical axis. Each lens has a screen side surface facing the screen side and allowing the image beam to pass, and a display side surface facing the display side and allowing the image beam to pass. The first and third lenses have a negative refractive power, and the second and fourth lenses have a positive refractive power. The projection lens satisfies 2<TTL/f<5. TTL is a distance from the screen side surface of the first lens to the display side surface of the fourth lens on the optical axis. f is an effective focal length of the projection lens. The projection lens covers a wide range of operating temperatures while being lightweight.

8 Claims, 12 Drawing Sheets

(56) References Cited

U.S. PATENT DOCUMENTS

2009/0316276 A1* 12/2009 Hsu .................... G02B 9/34
                                                        359/650
2019/0101724 A1*  4/2019 Chen ................... G02B 9/34

FOREIGN PATENT DOCUMENTS

| TW | 201326955 | 7/2013 |
| TW | I418843 | 12/2013 |
| TW | I427352 | 2/2014 |

* cited by examiner

PROJECTION LENS INCLUDING FOUR LENSES OF –+–+ REFRACTIVE POWERS

CROSS-REFERENCE TO RELATED APPLICATION

This application claims the priority benefit of China application serial no. 202021515224.3, filed on Jul. 28, 2020. The entirety of the above-mentioned patent application is hereby incorporated by reference herein and made a part of this specification.

BACKGROUND

Technical Field

The disclosure relates to an optical lens, and particularly relates to a projection lens.

Description of Related Art

Today, automotive display equipment uses a projection device as an auxiliary display, and the goals are to develop lightweight projection devices with good weather resistance. Therefore, various manufacturers are focusing on designing a suitable lens structure, while also having the need to consider the weight and volume and effectively reduce the production cost. Under these various considerations, most lightweight lenses are prime lenses. The current prime lens structure generally uses plastic aspheric lenses to meet the requirements of miniaturization and lightweight.

However, the use of plastic aspheric lenses has the following problems. In an environment that requires impact and salt spray resistance, plastic lenses are relatively fragile. Furthermore, although plastic lenses can reduce thermal drift through the combination of negative/positive refractive powers, this balance may be affected when the temperature changes, increasing the thermal drift, thus affecting the resolution of an image.

In addition, when different projection distances are required, the projection lens needs to be designed with a focusing structure, thus increasing the complexity of the mechanism. Furthermore, the design of the lenses in the projection lens does not reserve space to enable an optical path to bend, making it difficult to further reduce the length of the projection lens.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection lens, which is lightweight and covers a wide range of operating temperatures.

An embodiment of the disclosure provides a projection lens for projecting an image beam provided by a light valve onto a screen. The projection lens includes a first lens, a second lens, a third lens, and a fourth lens in order from a screen side to a display side along an optical axis. Each of the first lens to the fourth lens has a screen side surface facing the screen side and allowing the image beam to pass, and a display side surface facing the display side and allowing the image beam to pass. The first lens has a negative refractive power, the second lens has a positive refractive power, the third lens has a negative refractive power, and the fourth lens has a positive refractive power. The projection lens satisfies $2<TTL/f<5$. TTL is a distance from the screen side surface of the first lens to the display side surface of the fourth lens on the optical axis, and f is an effective focal length of the projection lens.

Based on the above, in the projection lens of an embodiment of the disclosure, since the projection lens satisfies $2<TTL/f<5$, the projection lens meets the market requirement of being lightweight while maintaining a high yield rate.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
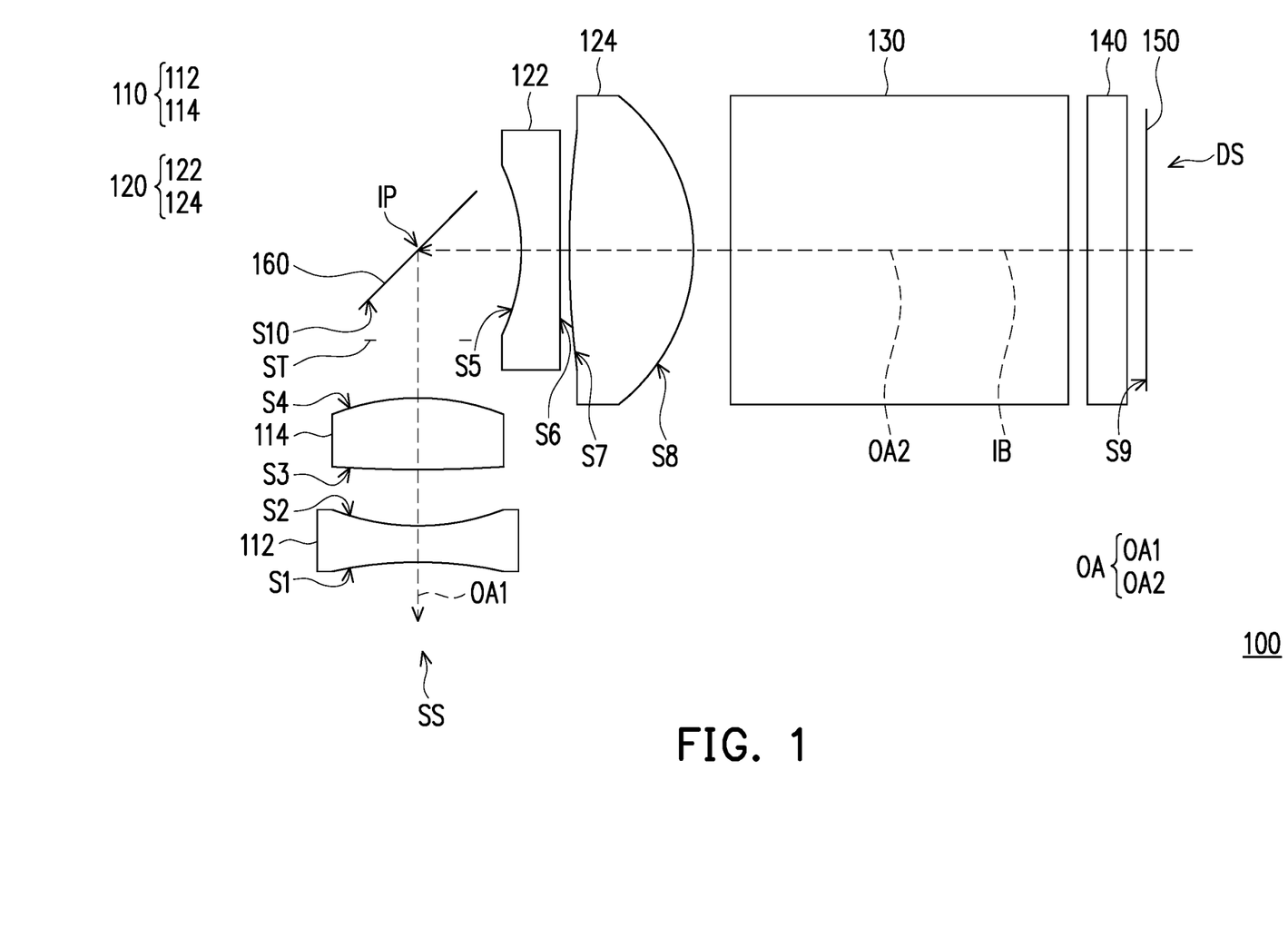
FIG. 1 is a schematic diagram of a projection lens according to an embodiment of the disclosure.

FIG. 1 is a schematic diagram of a projection lens according to an embodiment of the disclosure. Referring to FIG. 1, an embodiment of the disclosure provides a projection lens 100 for projecting an image beam IB provided by a light valve 150 onto a screen, and the projection lens 100 is a prime lens. The projection lens 100 includes a first lens 112, a second lens 114, a third lens 122, and a fourth lens 124 in order from a screen side SS to a display side DS along an optical axis OA. The first lens 112 to the fourth lens 124 each have (on the optical axis OA) screen side surfaces S1, S3, S5, and S7 that face the screen side SS and allow the image beam IB to pass, and (on the optical axis OA) display side surfaces S2, S4, S6, S8 that face the display side DS and allow the image beam IB to pass.

In this embodiment, the light valve 150 is, for example, a spatial light modulator such as a Digital Micro-mirror Device (DMD), a Liquid-crystal-on-silicon Panel (LCOS Panel), or a Liquid Crystal Panel (LCD), but the disclosure is not limited thereto.

In order to improve the weather resistance of the projection lens 100, the first lens 112, the second lens 114, the third lens 122, and the fourth lens 124 of this embodiment are preferably glass lenses with refractive power; however, the materials of the first lens 112, the second lens 114, the third lens 122, and the fourth lens 124 are not limited thereto. In this embodiment, the lenses with refractive power in the projection lens 100 are only the first lens 112, the second lens 114, the third lens 122, and the fourth lens 124.

In this embodiment, the first lens 112 has a negative refractive power. The screen side surface S1 of the first lens 122 is concave in the paraxial region (ie, the region near the optical axis OA), and the display side surface S2 of the first lens 122 is concave in the paraxial region. The second lens 114 has a positive refractive power. The screen side surface S3 of the second lens 114 is convex in the paraxial region, and the display side surface S4 of the second lens 114 is convex in the paraxial region. The third lens 122 has a negative refractive power. The screen side surface S5 of the third lens 122 is concave in the paraxial region, and the display side surface S6 of the third lens 122 is concave in the paraxial region. The fourth lens 124 has a positive refractive power. The screen side surface S7 of the fourth lens 124 is convex in the paraxial region, and the display side surface S8 of the fourth lens 124 is convex in the paraxial region.

Other detailed optical data of this embodiment are shown in Table 1 below.

TABLE 1

| Element | Surface | Surface type | Radius of curvature (mm) | Thickness (mm) | Refractive index | Abbe number |
|---|---|---|---|---|---|---|
| First lens 112 | S1 | Spherical | −11.49 | 1.00 | 1.62 | 36.26 |
|  | S2 | Spherical | 6.33 | 1.55 |  |  |
| Second lens 114 | S3 | Aspherical | 20.16 | 1.87 | 1.90 | 31.00 |
|  | S4 | Aspherical | −7.76 | 1.62 |  |  |
| Diaphragm ST |  |  |  | 5.3 |  |  |
| Third lens 122 | S5 | Spherical | −5.40 | 1.00 | 1.86 | 22.73 |
|  | S6 | Spherical | 191.25 | 0.20 |  |  |
| Fourth lens 124 | S7 | Aspherical | 12.95 | 3.41 | 1.74 | 49.34 |
|  | S8 | Aspherical | −4.65 |  |  |  |

In this embodiment, one of the first lens 112 and the second lens 114 is an aspheric lens. One of the third lens 122 and the fourth lens 124 is an aspheric lens. The following description is based on an example where the second lens 114 and the fourth lens 124 are aspheric lenses.

In this embodiment, the screen side surfaces S3 and S7 are aspherical surfaces, and the display side surfaces S4 and S8 are aspherical surfaces, and these aspherical surfaces are defined by the following equation:

$$Z(Y) = \frac{Y^2}{R}\left(1 + \sqrt{1-(1+K)\frac{Y^2}{R^2}}\right) + \sum_{i=1}^{n} a_{2i} \times Y^{2i} \quad (1)$$

where:
Y: the perpendicular distance between a point on an aspherical curve and the optical axis OA;
Z: the depth of the aspherical surface (the perpendicular distance between a point on the aspherical surface having the distance Y from the optical axis OA and a tangent plane tangential to a vertex of the aspherical surface along the optical axis OA);
R: the radius of curvature of the lens surface near the optical axis OA;
K: a conic constant; and
$a_{2i}$: the $2i^{th}$ aspheric coefficient.

The aspheric coefficients of the screen side surfaces S3 and S7 and the display side surfaces S4 and S8 in Equation (1) are shown in Table 2 below, among which the column number S3 in Table 2 indicates the aspheric coefficient of the screen side surface S3 of the second lens 114, and the other columns can be deduced according to the above. In this embodiment, $a_2$ is 0.

TABLE 2

| Surface | S3 | S4 | S7 | S8 |
|---|---|---|---|---|
| K | −9.90E+01 | 7.89E+00 | −3.77E+00 | −6.77E−01 |
| $a_4$ | 1.01E−03 | 1.95E−03 | −1.33E−03 | 1.95E−04 |
| $a_6$ | −2.31E−04 | 4.25E−05 | 6.06E−05 | −3.34E−06 |
| $a_8$ | −4.88E−06 | 1.94E−05 | −3.06E−06 | −4.35E−07 |
| $a_{10}$ | −1.39E−06 | −4.71E−06 | 1.45E−07 | 2.25E−08 |
| $a_{12}$ | 2.21E−07 | 1.46E−06 | −3.34E−09 | −2.46E−10 |

In this embodiment, the projection lens 100 further includes a diaphragm ST. The diaphragm ST is configured between the second lens 114 and the third lens 122 on the optical axis OA.

In this embodiment, the projection lens 100 further includes a reflective element 160. The reflective element 160 may be a mirror or a beam splitter. The reflective element 160 is configured between the diaphragm ST and the third lens 122 on the optical axis OA. The optical axis OA includes a first optical axis OA1 and a second optical axis OA2 that does not coincide with the first optical axis OA1, wherein the first lens 112 and the second lens 114 are configured on the first optical axis OA1, and the third lens 122 and the fourth lens 124 are configured on the second optical axis OA2. That is, the optical axis OA is bent by the reflective surface S10 of the reflective element 160. The second optical axis OA2 is a part of the optical axis OA before the optical axis OA is bent by the reflective element 160, and the first optical axis OA1 is another part of the optical axis OA after the optical axis OA is bent by the reflective element 160. The image beam IB transmitted along the second optical axis OA2 is reflected by the reflective surface S10 of the reflective element 160 and then transmitted along the first optical axis OA1. Therefore, the first optical axis OA1 and the second optical axis OA2 intersect at the intersection point IP on the reflective surface S10 of the reflective element 160. In the projection lens 100 of an embodiment of the disclosure, since the projection lens 100 is provided with the reflective element 160, the length of the projection lens 100 is reduced.

In this embodiment, the projection lens 100 further includes a first lens group 110 and a second lens group 120, wherein the optical axis of the first lens group 110 is the first optical axis OA1, and the optical axis of the second lens group 120 is the second optical axis OA2. The first lens group 110 has a positive refractive power and includes the first lens 112 and the second lens 114. The second lens group 120 has a positive refractive power and includes the third lens 122 and the fourth lens 124.

In this embodiment, the projection lens 100 further includes an illuminating prism 130 and a cover glass 140 configured between the fourth lens 124 and the light valve 150. The image beam IB provided by the light valve 150 passes through the illuminating prism 130 and enters the fourth lens 124. In this embodiment, the cover glass 140 is configured between the light valve 150 and the illuminating prism 130 to protect the light valve 150 from the impact of dust.

In an embodiment, an illuminating prism is not necessarily required to be configured in the projection lens.

In this embodiment, the projection lens 100 satisfies 2<TTL/f<5, wherein TTL is a distance from the screen side surface S1 of the first lens 112 to the display side surface S8 of the fourth lens 124 on the optical axis OA1, and f is the effective focal length of the projection lens 100.

In this embodiment, the projection lens 100 also satisfies: BFL/f>1.45, wherein BFL is a distance from the display side surface S8 of the fourth lens 124 to the display side surface S9 of the light valve 150 on the optical axis OA. When the optical characteristic of the projection lens 100 is BFL/f<1.45, the space between the fourth lens 124 and the light valve 150 of the projection lens 100 is insufficient, and thus a problem of mutual interference of components in the mechanism may be possible. In an embodiment of the disclosure, since the projection lens 100 meets the condition of BFL/f>1.45, the projection lens 100 has enough space for other elements to be placed between the fourth lens 124 and the light valve 150, such as the illuminating prism 130 and the cover glass 140; therefore, the problem of mechanical interference of various components is reduced.

Based on the above, when the optical characteristic of the projection lens 100 is TTL/f<2, the sensitivity of the projection lens increases, resulting in a decrease in yield rate, and an increase in production cost. Furthermore, when the optical characteristic of the projection lens 100 is TTL/f>5, the volume of the projection lens becomes larger and cannot meet the market requirement of being lightweight. In the projection lens 100 of an embodiment of the disclosure, since the projection lens 100 meets the condition of 2<TTL/f<5, and the condition of 2<TTL/f<5 limits the length of the projection lens 100, the projection lens 100 can meet the market requirement of being lightweight while maintaining a high yield rate.

Figure 2:
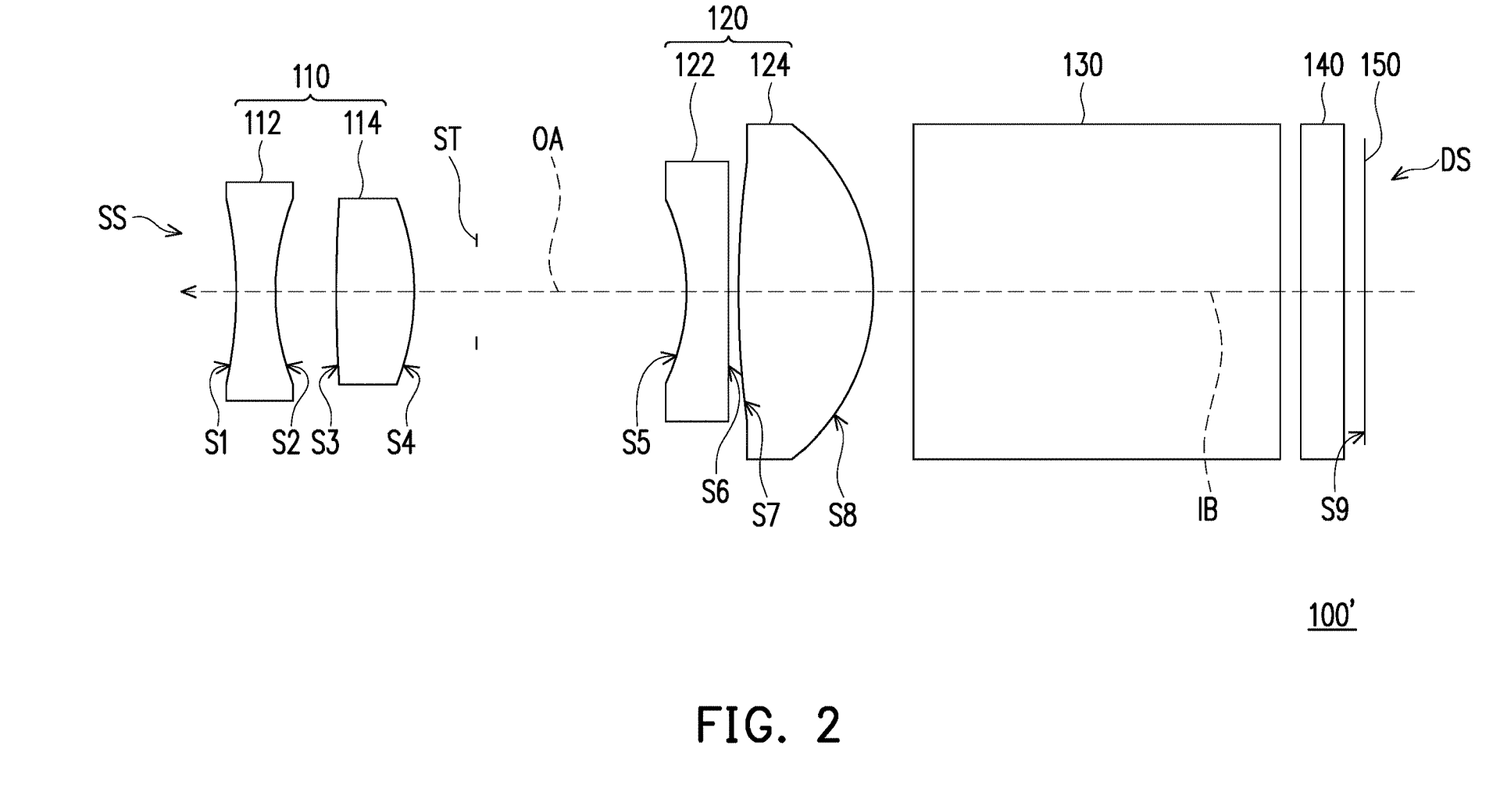
FIG. 2 is a schematic diagram of a projection lens according to another embodiment of the disclosure.

FIG. 2 is a schematic diagram of a projection lens according to another embodiment of the disclosure. Referring to FIG. 2, in this embodiment, the projection lens 100' omits the reflective element 160 of FIG. 1; therefore, the production of the projection lens 100' is relatively simple, enabling the yield rate to be improved.

Figure 3:
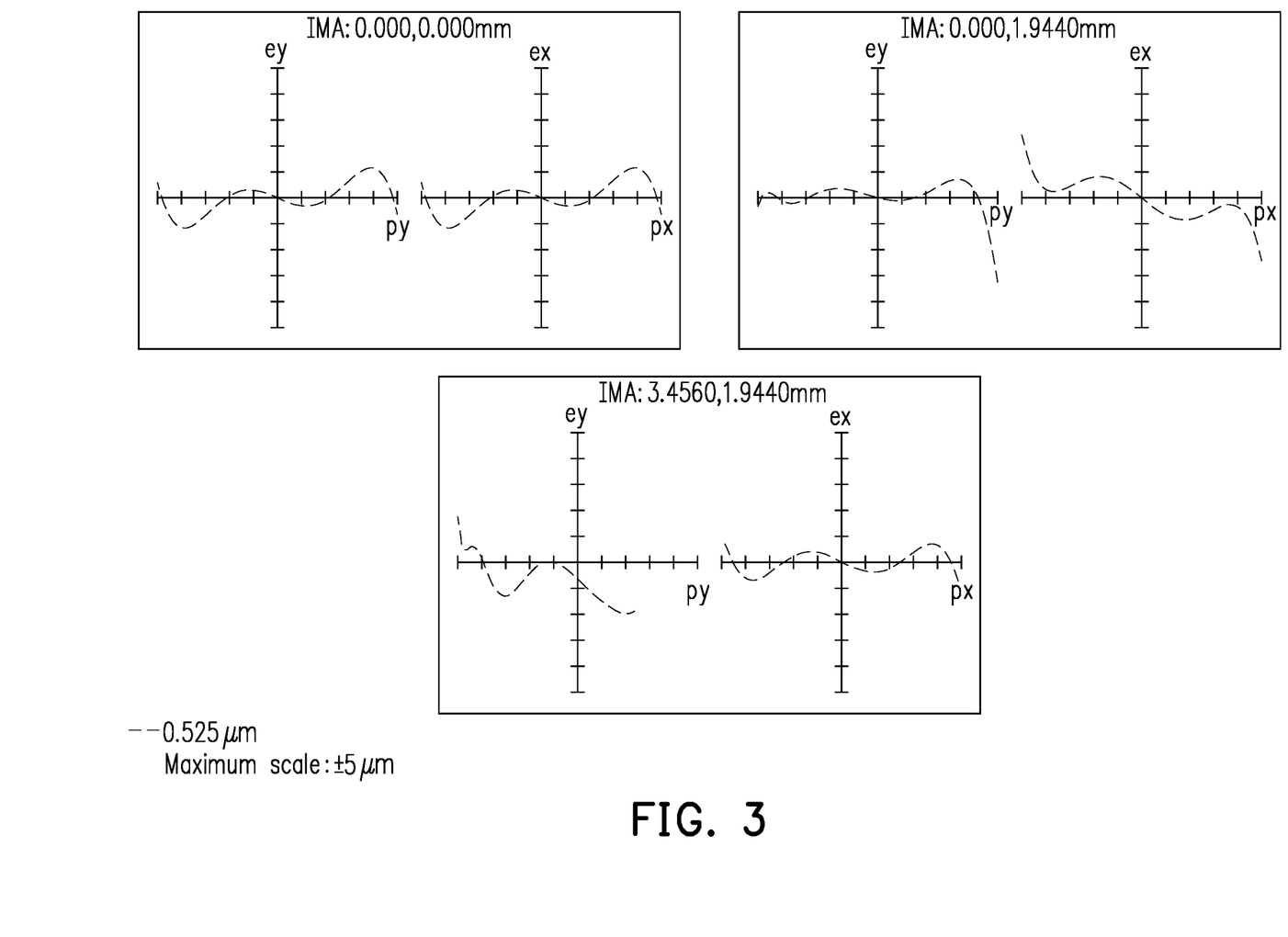
FIG. 3 is a diagram of a transverse ray fan plot of a projection lens according to an embodiment of the disclosure.

FIG. 3 is a transverse ray fan plot of a projection lens according to an embodiment of the disclosure. Referring to FIG. 3, FIG. 3 illustrates the transverse ray fan plot of the projection lens 100 of FIG. 1 or the projection lens 100' of FIG. 2 when the wavelength of light is 0.525 μm. Since the patterns shown in FIG. 3 are all within the standard range, it is verified that the projection lenses 100 and 100' of this embodiment achieve good imaging effects.

Figure 4:
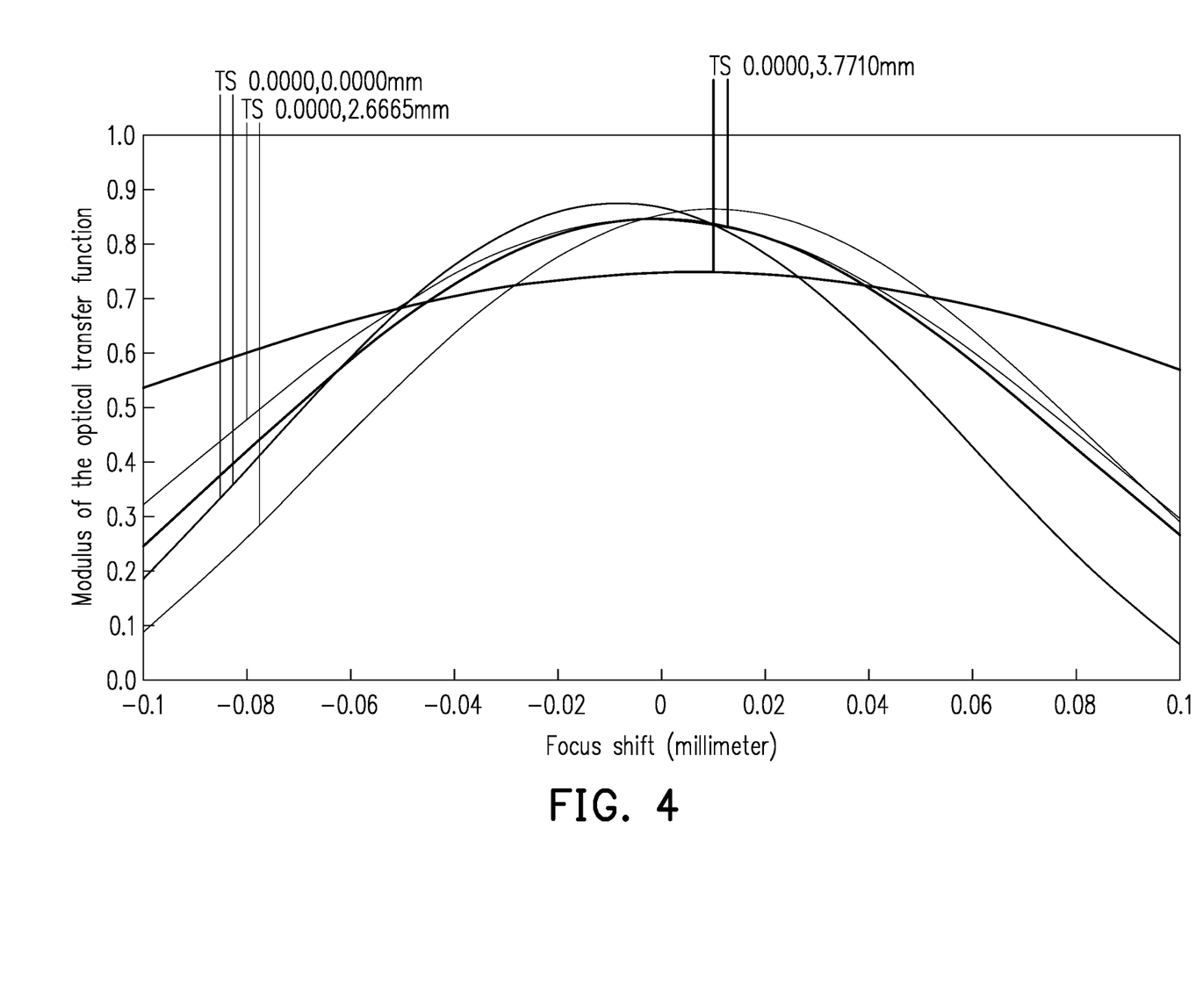
FIG. 4 is a diagram of a modulation transfer function of the projection lens on a display surface of a light valve with the direction of reversely tracking according to an embodiment of the disclosure.
Figure 5:
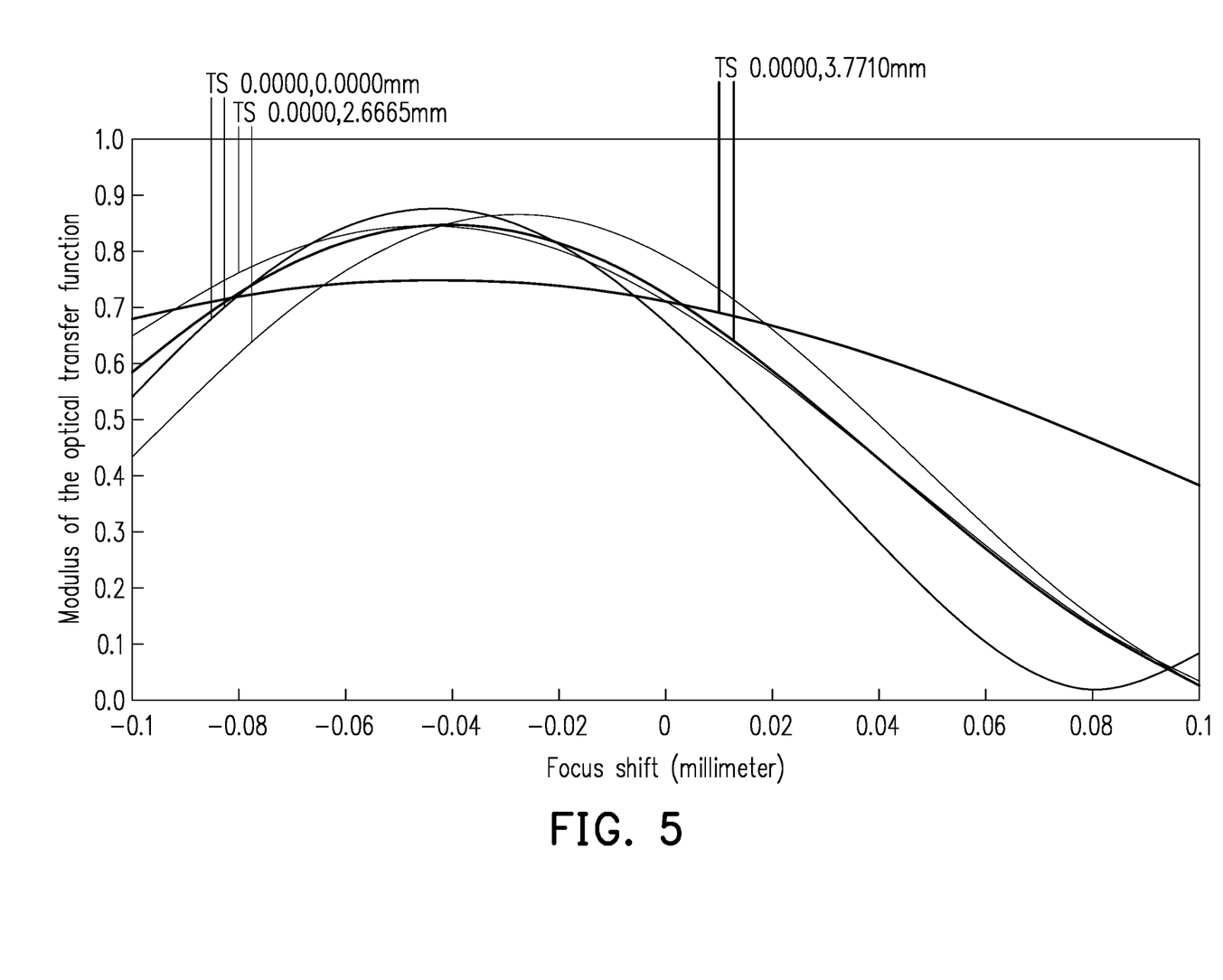
FIG. 5 is a diagram of the modulation transfer function of the projection lens at 30 cm from a screen side with the direction of reversely tracking on the display surface of the light valve according to an embodiment of the disclosure.
Figure 6:
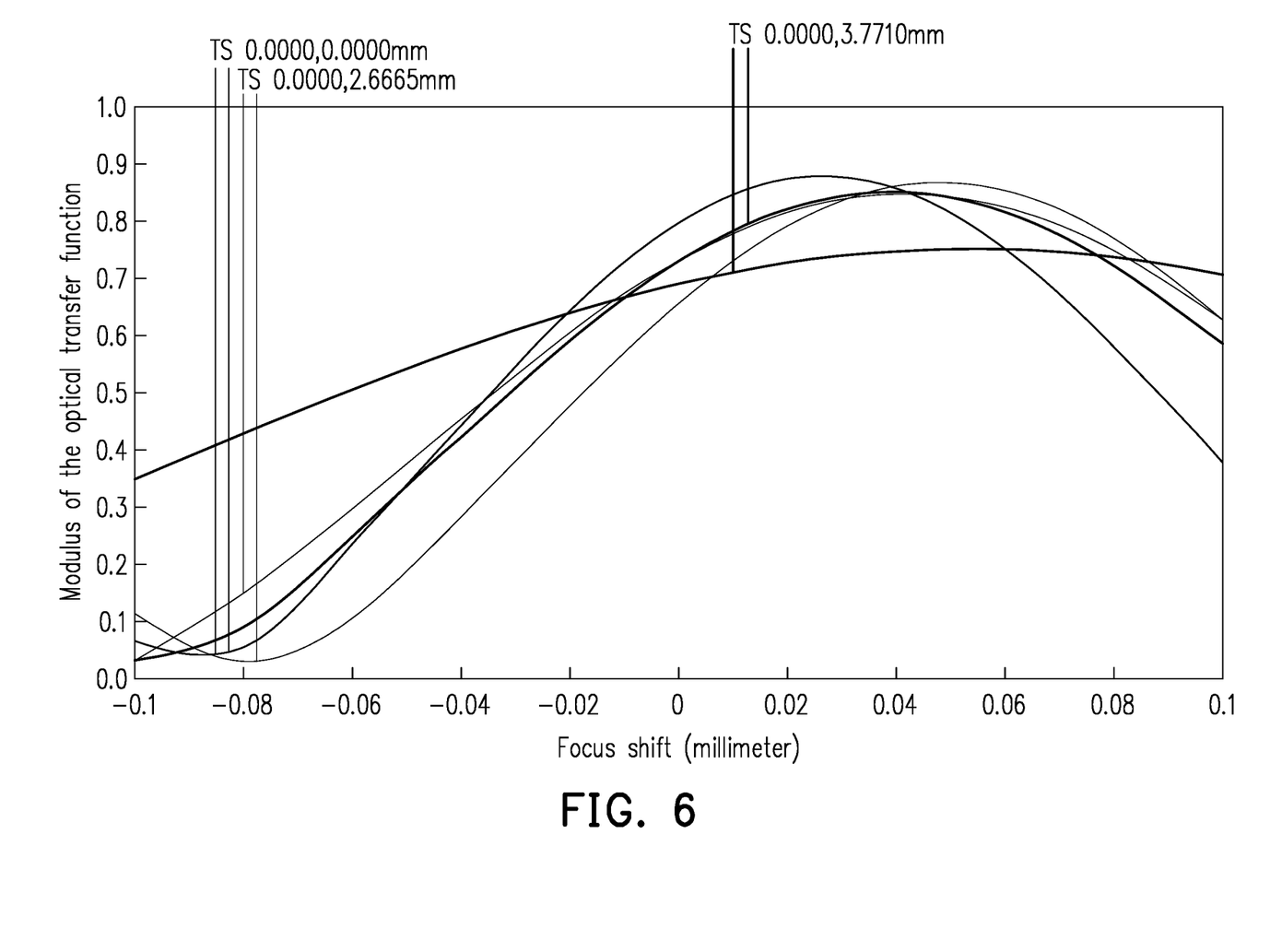
FIG. 6 is a diagram of the modulation transfer function of the projection lens at 50 cm from the screen side with the direction of reversely tracking on the display surface of the light valve according to an embodiment of the disclosure.
Figure 7:
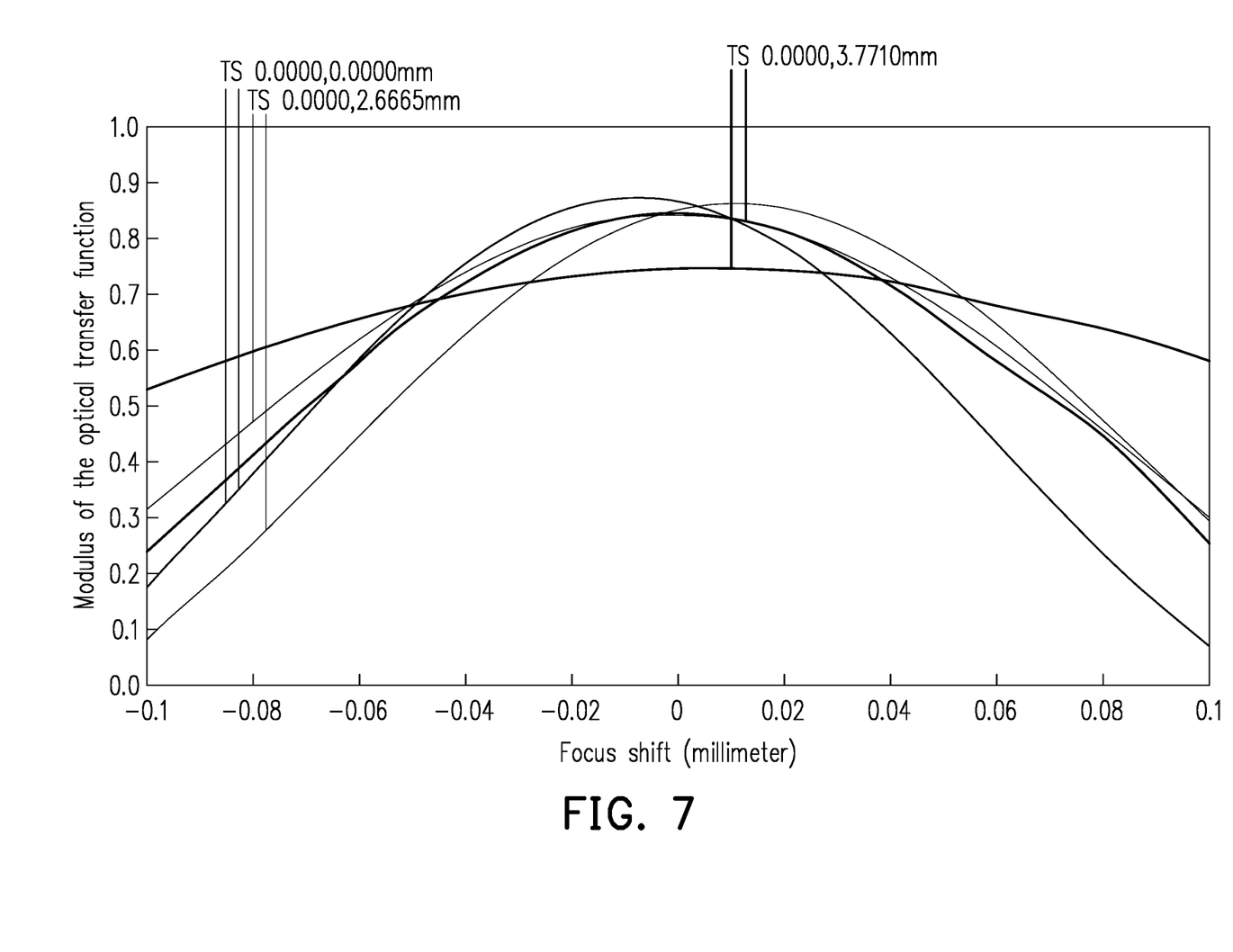
FIG. 7 is a diagram of the modulation transfer function of a projection lens at a system temperature of 60 degrees with the direction of reversely tracking on the display surface of the light valve according to an embodiment of the disclosure.
Figure 8:
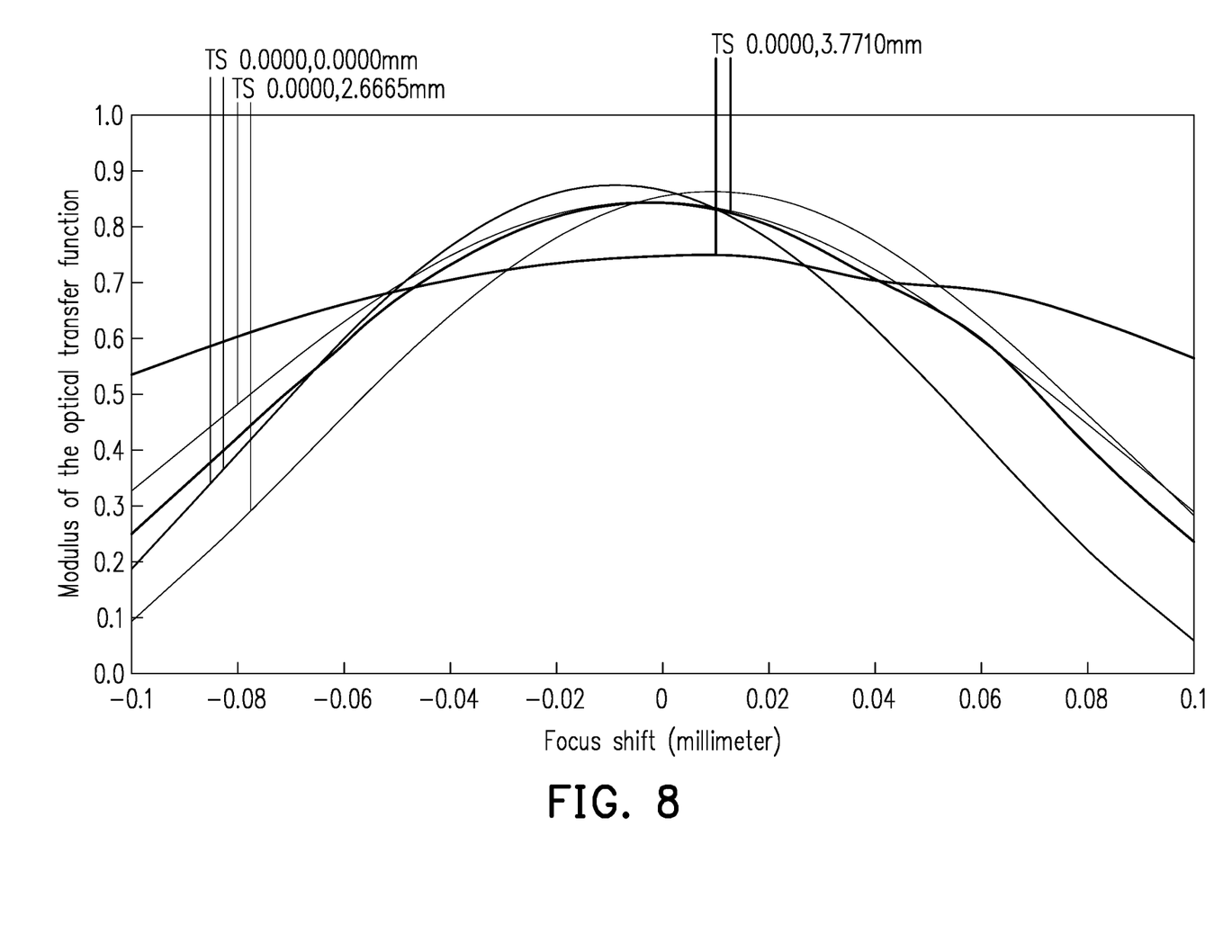
FIG. 8 is a diagram of the modulation transfer function of a projection lens at a system temperature of −20 degrees with the direction of reversely tracking on the display surface of the light valve according to an embodiment of the disclosure.
Figure 9:
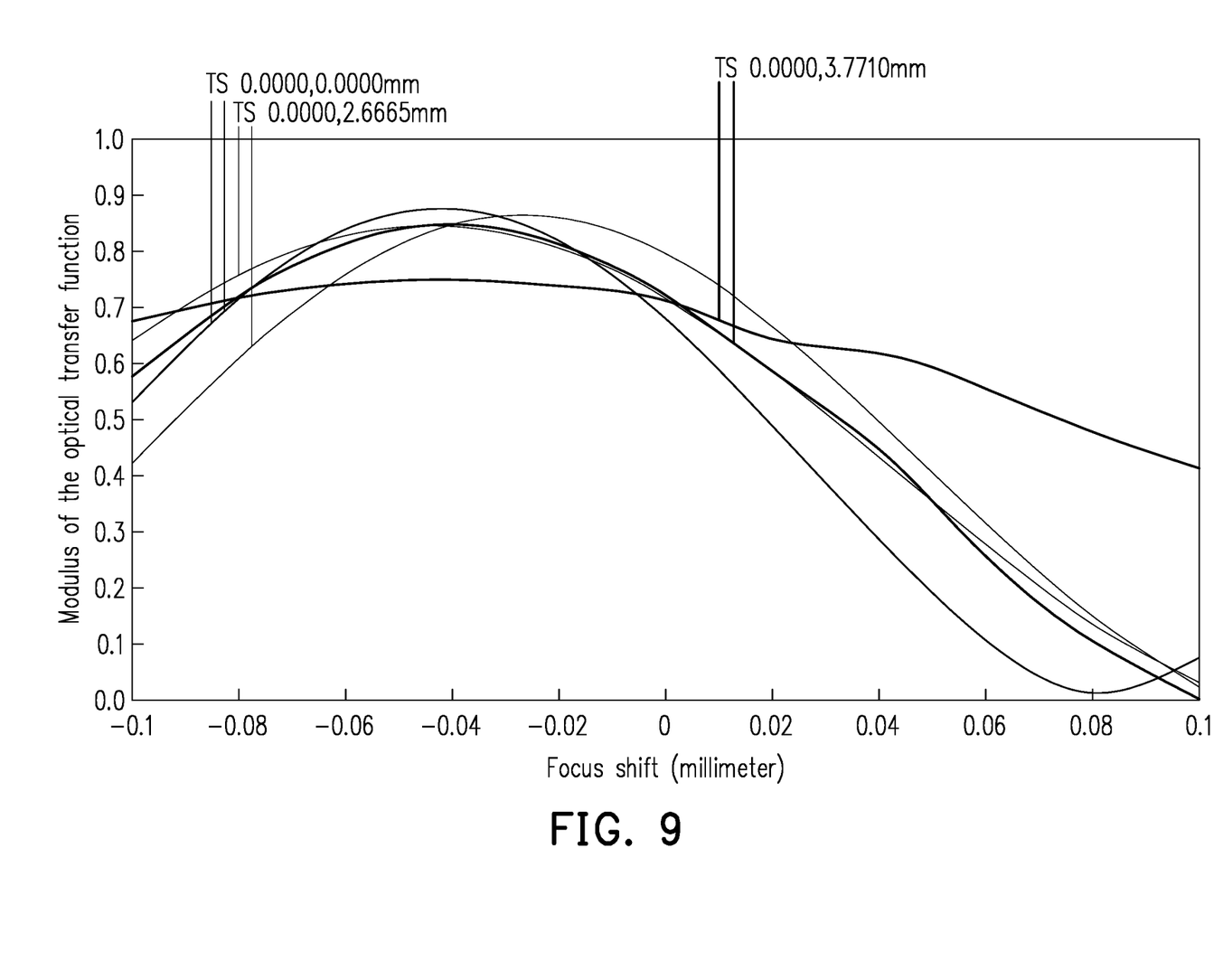
FIG. 9 is a diagram of the modulation transfer function of the projection lens at 30 cm from the screen side and at a system temperature of 60 degrees with the direction of reversely tracking on the display surface of the light valve according to an embodiment of the disclosure.
Figure 10:
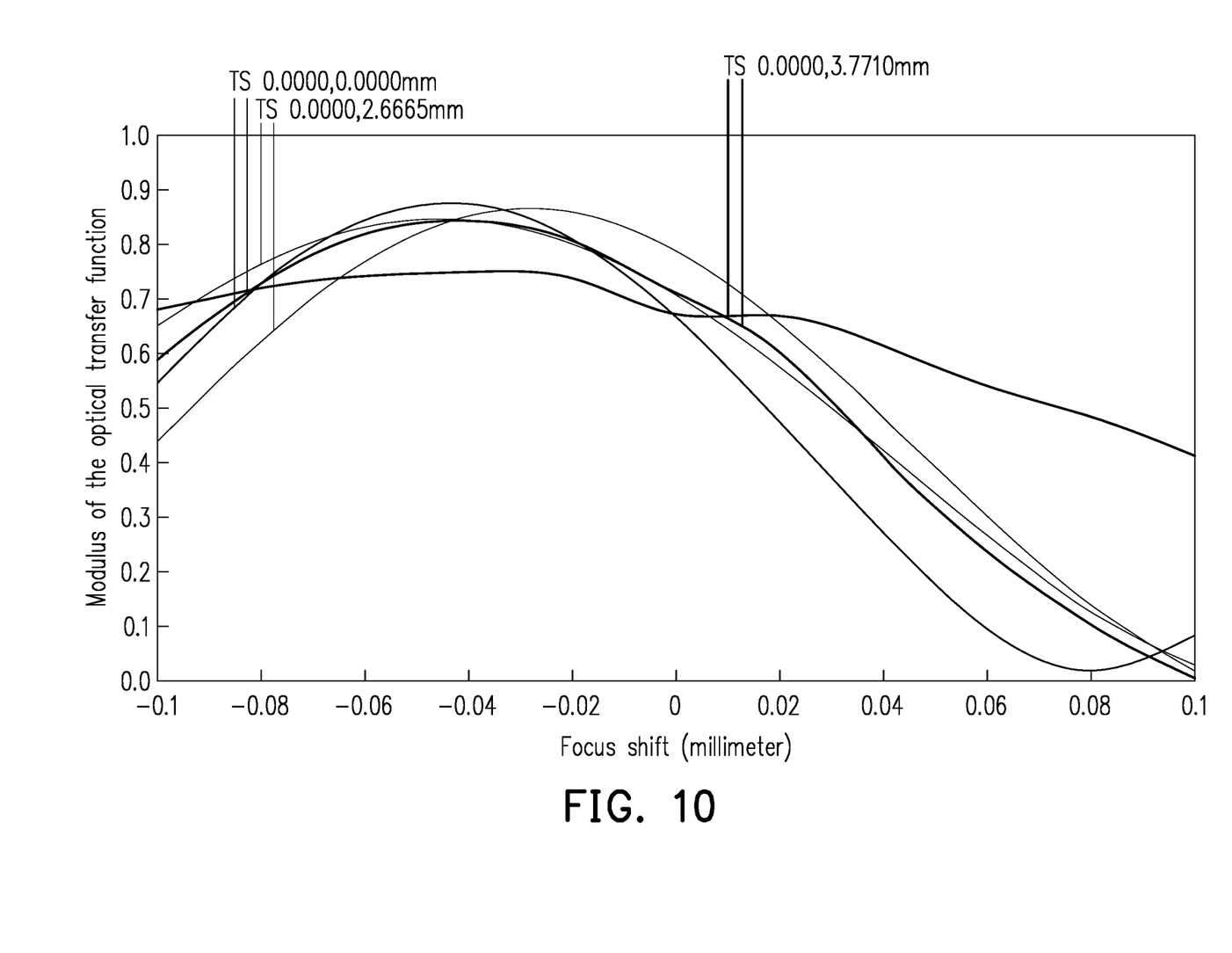
FIG. 10 is a diagram of the modulation transfer function of the projection lens at 30 cm from the screen side and at a system temperature of −20 degrees with the direction of reversely tracking on the display surface of the light valve according to an embodiment of the disclosure.
Figure 11:
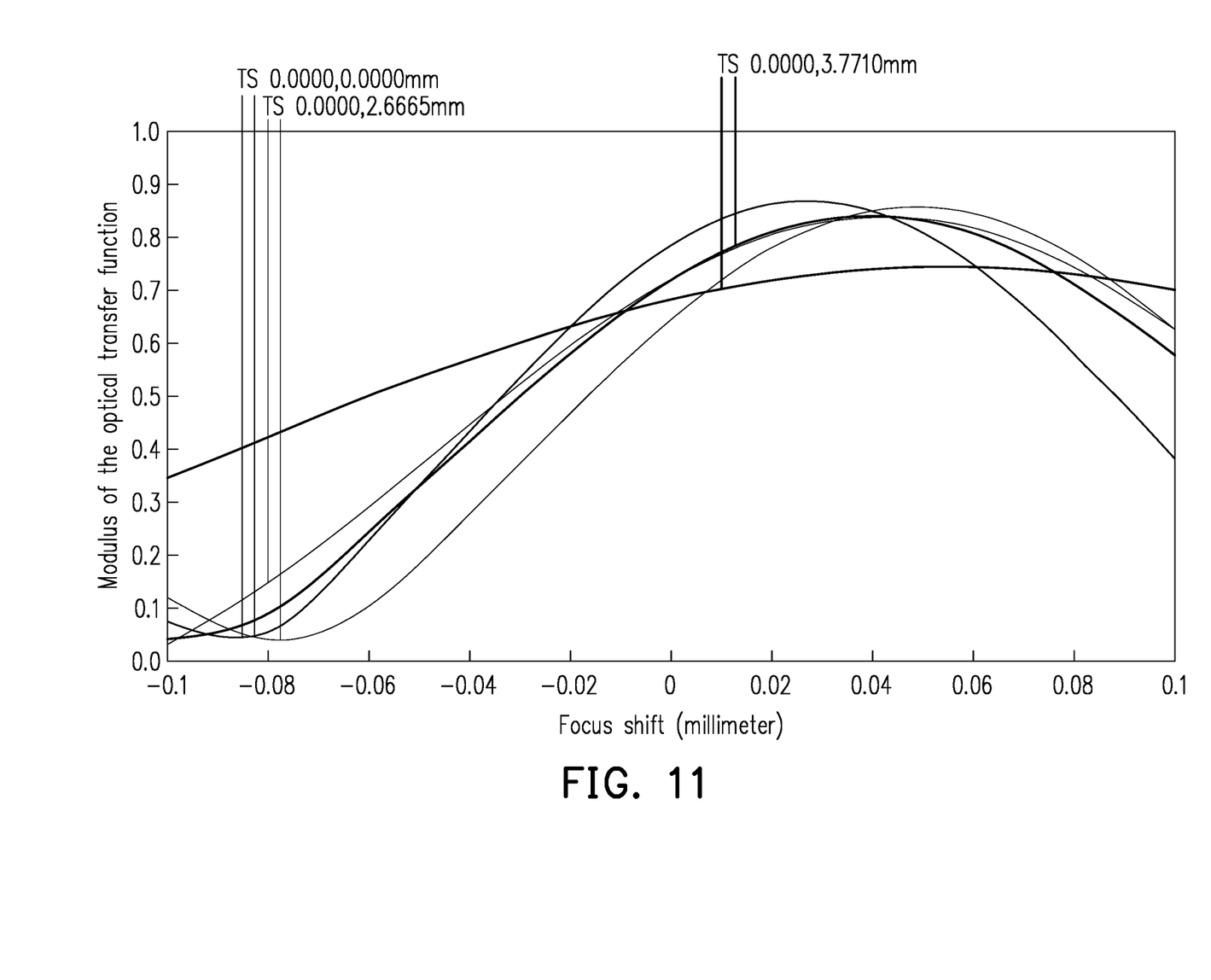
FIG. 11 is a diagram of the modulation transfer function of a projection lens at 50 cm from the screen side and at a system temperature of 60 degrees with the direction of reversely tracking on the display surface of the light valve according to an embodiment of the disclosure.
Figure 12:
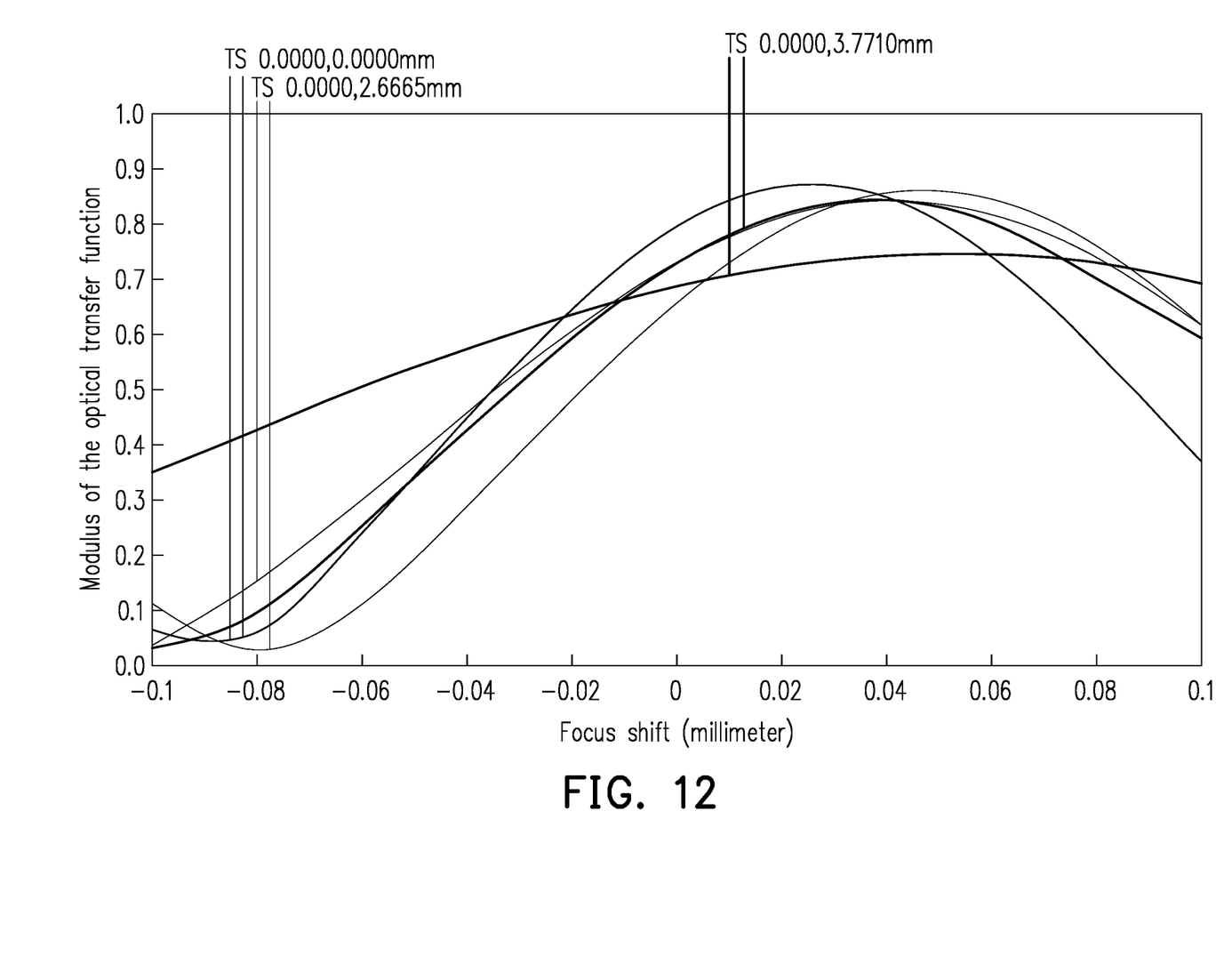
FIG. 12 is a diagram of the modulation transfer function of the projection lens at 50 cm from the screen side and at a system temperature of −20 degrees with the direction of reversely tracking on the display surface of the light valve according to an embodiment of the disclosure.

FIG. 4 is a diagram of the modulation transfer function (MTF) of the projection lens on the display surface of the light valve with the direction of reversely tracking according to an embodiment of the disclosure. FIG. 5 is a diagram of the modulation transfer function of the projection lens at 30 cm from the screen side with the direction of reversely tracking on the display surface of the light valve according to an embodiment of the disclosure. FIG. 6 is a diagram of the modulation transfer function of the projection lens at 50 cm from the screen side with the direction of reversely tracking on the display surface of the light valve according to an embodiment of the disclosure. FIG. 7 is a diagram of the modulation transfer function of a projection lens at a system temperature of 60 degrees with the direction of reversely tracking on the display surface of the light valve according to an embodiment of the disclosure. FIG. 8 is a diagram of the modulation transfer function of a projection lens at a system temperature of −20 degrees with the direction of reversely tracking on the display surface of the light valve according to an embodiment of the disclosure. FIG. 9 is a diagram of the modulation transfer function of the projection lens at 30 cm from the screen side and at a system temperature of 60 degrees with the direction of reversely tracking on the display surface of the light valve according to an embodiment of the disclosure. FIG. 10 is a diagram of the modulation transfer function of the projection lens at 30 cm from the screen side and at a system temperature of −20 degrees with the direction of reversely tracking on the display surface of the light valve according to an embodiment of the disclosure. FIG. 11 is a diagram of the modulation transfer function of a projection lens at 50 cm from the screen side and at a system temperature of 60 degrees with the direction of reversely tracking on the display surface of the light valve according to an embodiment of the disclosure. FIG. 12 is a diagram of the modulation transfer function of the projection lens at 50 cm from the screen side and at a system temperature of −20 degrees with the direction of reversely tracking on the display surface of the light valve according to an embodiment of the disclosure. Among the above, the reversely tracking is a parallel imaging light passing through the projection lenses 100 and 100' from the screen side SS to one side of the display surface S9 of the light valve 150 to focus and form an image, thereby forming the imaging quality graphs of FIG. 4 to FIG. 12.

Referring to FIG. 4 to FIG. 12, FIG. 4 to FIG. 12 illustrate the modulation transfer functions (MTF) of the projection lens 100 of FIG. 1 or the projection lens 100' of FIG. 2 on the display surface S9 of the light valve 150, at a distance of 30 cm from the screen side surface S1 of the first lens 112, and at a distance of 50 cm from the screen side surface S1 of the first lens 112 with the system temperature being a room temperature, −20 degrees, and 60 degrees when the wavelength of light is 0.525 μm, among which the horizontal axis is the focus shift, the unit being millimeter, and the vertical axis is the modulus of the optical transfer function. T represents the curve in the tangential direction; S represents the curve in the sagittal direction; and the value marked next to "TS" represents image height.

It is thus verified that the optical transfer function curves displayed by the projection lenses 100 and 100' of this embodiment are within the standard range, and therefore have good optical imaging quality, as shown in FIG. 4 to FIG. 12. Therefore, the projection lenses 100 and 100' of an embodiment of the disclosure maintain good image quality at different high/low temperatures. Moreover, without adjusting the focal length, the projection lenses 100 and 100' maintain good image quality within a projection distance of 30 to 50 cm.

In addition, in an embodiment, at least one of the first lens group 110 and the second lens group 120 is a fixed lens group, and the other lens group is a movable lens group. In other words, when the projection distance exceeds the range of 30 to 50 cm, the focal length can be adjusted by moving the movable lens group in the first lens group 110 and the second lens group 120 to make the image projected to the screen clearer.

In summary, in the projection lens of an embodiment of the disclosure, since the first lens has a negative refractive power, the second lens has a positive refractive power, the third lens has a negative refractive power, and the fourth lens has a positive refractive power, the projection lens maintains good image quality at different high/low temperatures, and maintains good image quality within a projection distance of 30 to 50 cm without having to adjust the focal length. Furthermore, the projection lens satisfies 2<TTL/f<; therefore, the projection lens meets the market requirement of being lightweight while maintaining a high yield rate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection lens configured to project an image beam provided by a light valve onto a screen, wherein the projection lens have only four lenses which are a first lens, a second lens, a third lens, and a fourth lens, the projection lens comprises a first lens group and a second lens group in order from a screen side to a display side along an optical axis, the first lens group consists of the first lens and the second lens, the second lens group consists of the third lens and the fourth lens in order from the screen side to the display side along the optical axis, and the first lens, the second lens, the third lens, and the fourth lens are glass lenses, wherein each of the first lens to the fourth lens has a screen side surface facing the screen side and allowing the image beam to pass, and a display side surface facing the display side and allowing the image beam to pass, wherein:

the first lens has a negative refractive power, the second lens has a positive refractive power, the third lens has a negative refractive power, and the fourth lens has a positive refractive power; and the projection lens satisfies:

$2<TTL/f<5$, wherein TTL is a distance from the screen side surface of the first lens to the display side surface of the fourth lens on the optical axis, and f is an effective focal length of the projection lens, and $BFL/f>1.45$, wherein BFL is a distance from the display side surface of the fourth lens to a display surface of the light valve on the optical axis.

2. A projection lens configured to project an image beam provided by a light valve onto a screen, wherein the projection lens have only four lenses which are a first lens, a second lens, a third lens, and a fourth lens, the projection lens comprises a first lens group and a second lens group in order from a screen side to a display side along an optical axis, the first lens group consists of the first lens and the second lens, the second lens group consists of the third lens and the fourth lens in order from the screen side to the display side along the optical axis, and the first lens, the second lens, the third lens, and the fourth lens are glass lenses, wherein each of the first lens to the fourth lens has a screen side surface facing the screen side and allowing the image beam to pass, and a display side surface facing the display side and allowing the image beam to pass, wherein:

the first lens has a negative refractive power, the second lens has a positive refractive power, the third lens has a negative refractive power, and the fourth lens has a positive refractive power; and the projection lens satisfies:

$2<TTL/f<5$, wherein TTL is a distance from the screen side surface of the first lens to the display side surface of the fourth lens on the optical axis, and f is an effective focal length of the projection lens, wherein the projection lens further comprises: a diaphragm, which is configured between the second lens and the third lens on the optical axis.

3. The projection lens according to claim 1, wherein the first lens group has a positive refractive power, and the second lens group has a positive refractive power.

4. The projection lens according to claim 1, wherein one of the first lens and the second lens is an aspheric lens.

5. The projection lens according to claim 1, wherein one of the third lens and the fourth lens is an aspheric lens.

6. A projection lens configured to project an image beam provided by a light valve onto a screen, wherein the projection lens comprises a first lens, a second lens, a third lens, and a fourth lens in order from a screen side to a display side along an optical axis, wherein each of the first lens to the fourth lens has a screen side surface facing the screen side and allowing the image beam to pass, and a display side surface facing the display side and allowing the image beam to pass, wherein:

the first lens has a negative refractive power, the second lens has a positive refractive power, the third lens has a negative refractive power, and the fourth lens has a positive refractive power; and the projection lens satisfies:

$2<TTL/f<5$, wherein TTL is a distance from the screen side surface of the first lens to the display side surface of the fourth lens on the optical axis, and f is an effective focal length of the projection lens, wherein the projection lens further comprises a diaphragm and a reflective element, the diaphragm is configured between the second lens and the third lens on the optical axis, the reflective element is configured between the diaphragm and the third lens on the optical axis, wherein the optical axis comprises a first optical axis and a second optical axis that does not coincide with the first optical axis, and the first optical axis and the second optical axis intersect at an intersection point on a reflective surface of the reflective element.

7. The projection lens according to claim 1, wherein only the first lens, the second lens, the third lens, and the fourth lens have a refractive power in the projection lens.

8. The projection lens according to claim 3, wherein at least one of the first lens group and the second lens group is a fixed lens group.

* * * * *